United States Patent [19]

Barnetche

[11] 4,254,838

[45] Mar. 10, 1981

[54] AUTOMATIC DEPTH COMPENSATING DEVICE

[76] Inventor: Eduardo Barnetche, Ave. Universidad Num. 482., Mexico 13, D. F., Mexico

[21] Appl. No.: 60,056

[22] Filed: Jul. 24, 1979

[51] Int. Cl.³ .............................................. E21B 10/22
[52] U.S. Cl. ...................................... 175/228; 138/31; 184/39
[58] Field of Search ........................ 175/107, 227–229, 175/297; 184/39; 418/48; 308/8.2; 138/31

[56] References Cited

U.S. PATENT DOCUMENTS

| | | | |
|---|---|---|---|
| 3,244,459 | 4/1966 | Ortloff | 175/229 C |
| 3,251,634 | 5/1966 | Onreing | 308/8.2 |
| 3,467,146 | 9/1969 | Harson | 138/31 |
| 3,675,729 | 7/1972 | Nelson | 184/39 |
| 4,170,441 | 10/1979 | Trzecick | 418/48 |

Primary Examiner—William F. Pate, III

Attorney, Agent, or Firm—Armstrong, Nikaido, Marmelstein & Kubovcik

[57] ABSTRACT

An automatic depth compensating device is provided for controlling pressure in a volume in response to pressure changes in an environment adjacent to the volume. The compensating device comprises a cylinder which includes a first bore having a first cross-sectional area and a second bore having a second cross-sectional area, the first and second bores being axially aligned with one another. A first piston having a first surface area is slidably positioned in the first bore and a second piston having a second surface area is slidably positioned in the second bore. The first and second surface areas are different from one another. A coupling rigidly couples the first and second pistons together so that the first and second pistons move together. Another aspect of the present invention is the incorporation of the above-described automatic depth compensating device as an improvement in a rotary drill.

12 Claims, 5 Drawing Figures

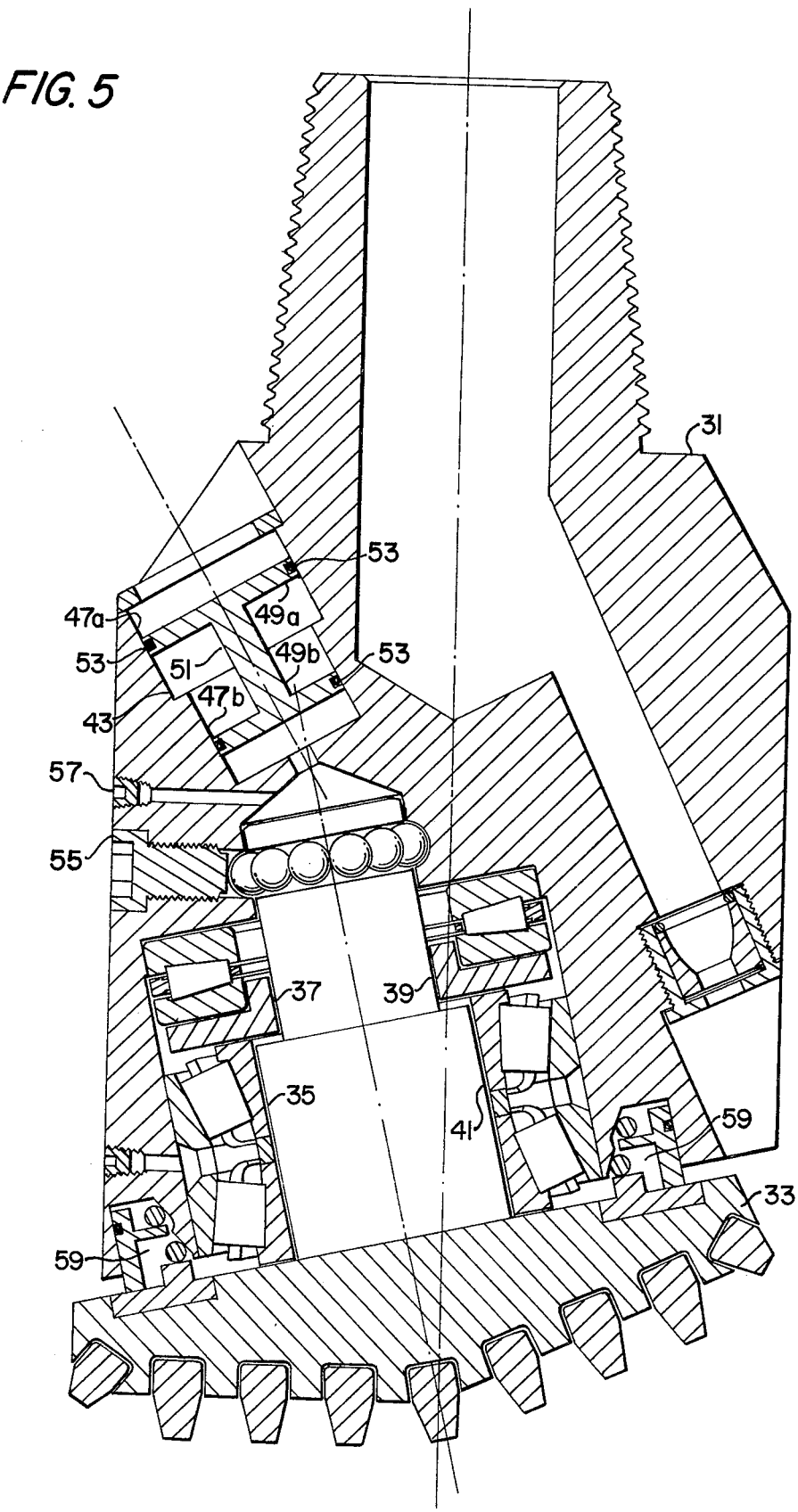

AUTOMATIC DEPTH COMPENSATING DEVICE

BACKGROUND OF THE INVENTION

1. Field of the Invention

The present invention is related to an automatic depth compensating device and the incorporation of the automatic depth compensating device as an improvement in a rotary drill and more particularly to an automatic depth compensating device which has first and second axially aligned pistons positioned in first and second bores wherein the area relationships between the surface areas of the first and second pistons and the bore is such that the pressure in the environment and the pressure in an adjacent volume act on the piston to maintain the pressure in the volume proportional to and greater than the pressure in the adjacent environment so that lubricant in the volume is forced into the environment around a seal therebetween. Furthermore, the present invention is more particularly directed to a rotary drill including the improvement of this type of automatic depth compensating device.

2. Description of the Prior Art

In all rotary drills applied to the drilling of wells in the ground as well as many types of devices used in wells which are either drilled or in the process of being drilled, there is a need to protect the inner working parts of the drills and devices from pressure and from the environment in which the drill device is working as the environment is often very agressive or damaging. The need for protection is most critical at points where there is relative movement between different parts of the device. Typically, problems of this type occur in the movement of drilling cones of tricone drill bits and in the movement of a single cutting head relative to drill bit body as in a Barnetche drill bit, such as that shown in U.S. Pat. No. 4,154,312. The problem with regard to protection also exists in devices other than drill bits as, for example, in downhole motors, downhole pumps, etc.

In devices such as those discussed above, since there is movement between parts, there is also a need for bearings of some type. The bearings in turn require a clean self-contained lubrication system and the fact that the relative movement occurs between different parts of these devices creates a need for a seal between the separately moving parts which will isolate the internal lubrication system from the downhole environment. It is these seals which are usually the most vulnerable element in these devices.

In actual drilling there are a number of adverse factors which exist simultaneously. Furthermore, many of these conditions exist in the downhole environment even after drilling is completed and, thus, have an impact on other types of downhole devices as well as drills.

One factor contributing to the performance requirement for seals on downhole devices is pressure. Due to the need for circulation of drilling fluids which are commonly employed in rotary drilling of high pressure wells, the pressure on devices at the bottom of the well are extreme. If the internal pressure of the self-contained lubrication system of the downhole device were to be at atmospheric pressure, the seals on the devices would be required to withstand tremendous differential pressures since the downhole pressure of the environment is very high. Further, the environment at the bottom of the hole is extremely agressive or damaging due to the presence of drilling fluid, mud, additives, drill cuttings, etc. The environment, thus, will produce a very erosive action on the seals. Failure of the seal under the large differential pressure load will result in leakage of the agressive downhole elements through the seal into the device itself producing rapid deterioration and failure of the internal components such as the bearings.

Other factors which also contribute to the pressure and agressive environment are vibration, load-shock, high temperatures and the particular formation being drilled.

In order to provide compensation for the extreme downhole pressures and to reduce the damaging effect of the agressive environment on the seals, pressure compensators have been used. An example of this can be found in U.S. Pat. No. 4,154,312 which is directed to the Barnetche bit. In the pressure compensator disclosed in this patent, a diaphragm is positioned between the interior and exterior of the downhole device in order to equalize pressure between the volume inside of the drill bit and the environment. Thus, this type of pressure compensator reduces the pressure differential to zero. However, pressure compensators such as that disclosed in the Barnetche bit patent have the disadvantage that at best they produce equal pressure between the inside of the drill bit and the environment. Furthermore, generally due to hysterisis and viscosity of internal lubricants the internal pressure is less than the external pressure. This means that at the seal, in the case of the differential pressure being zero, the seal tends to dry out since no lubricant is added to the seal faces. In the case of negative internal pressure, even though it is small, there will be a small amount of leakage in which the agressive external environment will enter between the sealed faces thereby accelerating seal wear. Furthermore, the harmful elements of this agressive environment will also have a damaging effect on the internal parts of the drill bit such as the bearings.

Other attempts have been made to solve this problem by variations of the basic compensator. One variation is including compensating lubricant bags or bellows. This has been utilized where the device interior volume is sufficiently high. The problem however, with this type of compensator is to find a source of motive force. One source which has been used is the pressure of the injected drilling mud, passing down the drill stem and through the drill bit, through a diaphragm device on the tool so as to maintain the internal lubricant permanently at an increased pressure. The problem with this solution is that it does not give true control of the differential pressure across the seal since there is no direct relation between mud pressure and downhole exterior pressure. The end result of this type of technique is that there is too little or too much lubricant flowing across the seal.

SUMMARY OF THE INVENTION

It is the primary object of the present invention to provide an automatic depth compensating seal lubricating device which will provide control for the flow of lubricant from the interior to the exterior of a downhole device.

It is another primary object of the present invention to provide an improvement to a Barnetche bit in the way of an automatic depth compensating seal lubricater to control the flow of lubricant from the interior of the Barnetche bit to the exterior thereof.

It is another object of the present invention to provide an automatic depth compensating device for maintaining the pressure within a volume greater than and proportional to the pressure in the environment adjacent to the volume.

It is a further object of the present invention to provide an automatic depth compensating device which comprises in combination, a cylinder device and piston device where the pressure of the environment and the pressure within an adjacent volume act on the piston device within the cylinder device to provide automatic pressure compensation in the adjacent volume in response to pressure changes in the environment.

It is still another object of the present invention to provide an automatic depth compensating device which comprises a cylinder and piston arrangement in which includes a pressure amplifier therein in order to enhance the control of the pressure within the volume as a function of pressure changes in the environment.

It is still a further object of the present invention to maintain a flow of lubricant within an enclosed volume formed by relatively moving parts with a seal therebetween wherein the flow of lubricant around the seal means in a direction towards an agressive outer environment whereby the seal life is prolonged by the application of lubricant and also by preventing the flow of damaging substances in the agressive environment towards the seal.

It is still a further object of the present invention to provide an improvement to a drill bit which incorporates all of the above objectives.

The present invention is directed to an automatic depth compensating device for controlling the pressure in a first volume in response to pressure changes in an environment adjacent to the first volume. The device comprises a cylinder which includes a first bore having a first cross-sectional area and a second bore having a second cross-sectional area, the first and second bores being axially aligned. A first piston having a first surface area is slidably positioned in the first bore and a second piston having a second surface area is slidably positioned in the second bore. The first and second surface areas are different. A coupling means rigidly couples the first and second pistons so that the pistons move together. The pressure in the environment against the first piston and the pressure in the first volume against the second piston causes the movement of these pistons within the cylinder such that the pressure compensating means maintains the pressure in the first volume proportional to and greater than the pressure in the environment, whereby lubricant in the first volume is forced into the environment around the seal. The forcing of the lubricant into the environment around the seal has two extremely important effects. First, the seal is lubricated by the lubricant thereby enhancing the seal life. Furthermore, since the pressure within the first volume is greater than the pressure of the environment, the damaging elements in the agressive environment are prevented from entering the first volume and thereby damaging the seal as well as the elements within the first volume.

The automatic depth compensating device of the present invention includes a second volume formed between the first and second pistons with this volume being sealed from the environment and from the first volume. In addition, the coupling which couples the first and second pistons is made with a cross-sectional area which can be negligible or substantial relative to the cross-sectional area of the pistons and thus, the structure of the present invention provides a means for controlling pressure amplification of the pressure differential between the pressure of the environment and the pressure within the first volume to thereby enhance the overall operation of the automatic depth compensating device.

Still another important aspect of the present invention is the incorporation of the automatic depth compensating and seal lubricating device in downhole devices which operate in agressive environments and furthermore, to incorporate the automatic depth compensating and seal lubricating device as an improvement in a rotary drill having a solid cutting head such as, for example, in a Barnetche bit.

BRIEF DESCRIPTION OF THE DRAWINGS

FIG. 5 illustrates the present invention incorporated into a solid cone rotary drill bit.

DETAILED DESCRIPTION OF THE PREFERRED EMBODIMENTS

Figure 1:
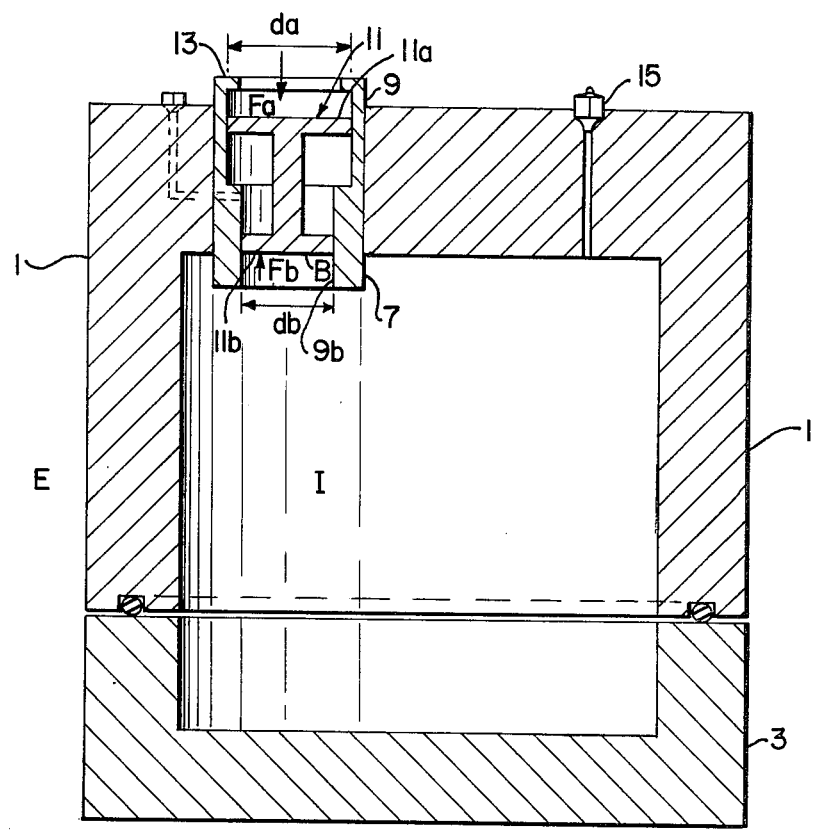
FIG. 1 is a cross-sectional view of a preferred embodiment of an automatic depth compensating and seal lubricating device of the present invention.

FIG. 1 illustrates in diagramatic form, an apparatus such as a downhole device which is formed of two parts, 1 and 3 which rotate with respect to each other about the X-Y axis. The enclosed interior space 5 contains elements associated with the device (not shown) and a lubricant (not shown) is also contained within volume or space 5 by means of a seal 7 such as an O-ring. The O-ring 7 seals the volume I from the surrounding environment E which is a downhole situation is an agressive environment. The pressure compensating and seal lubricating device 7 includes a cylinder 9 and piston 11, with the piston 11 being free to move within the cylinder 9. The cylinder 9 may be formed directly in the wall of 1 or as illustrated, may be in the form of a sleeve which is inserted and held in the wall of 1 by, for example, threading. The cylinder 9 has two bores 9a and 9b, with bore 9a having a larger diameter than bore 9b. Piston 11 has two faces or heads 11a and 11b, which are also of differing diameter and which have substantially the same diameters as the bores 9a and 9b. The upper limit of movement of the piston 11 is determined by stops 13 and the lower limit of movement is determined by stops 15.

In operation, the interior volume I is pre-filled with a lubricant and is at atmospheric pressure. The space or volume P within the cylinder 9 between piston heads 11a and 11b is also brought to atmospheric pressure. Lubricant is then added to the interior volume I through a valve 15 so that the piston 11 moves until it contacts stop 13. This ensures perfect filling of the volume I although there may or may not be a certain amount of air within the volume I unless special filling methods are employed. Generally, a downhole device will be evacuated by a vacuum pump to pre-fill the volume I with a lubricant in order to be able to precisely control the amount of air enclosed with the lubricant.

As the device progresses down a well increasing downhole pressure PE acts on the piston head 11a to create a force Fa where $$Fa = PE \cdot \pi (da/2)^2$$

where da equals the diameter of piston head 11a.

The force Fa as opposed by a force Fb exerted from the enclosed interior I where the pressure is PI where $$Fb = PI \cdot \pi (db/2)^2$$

where db is the diameter of piston head 11b.

Since PE is greater than atmospheric pressure and db is less than da, Fa is greater than Fb and thus ignoring the effect of friction, the piston will move away from stop 13 towards the interior I and continue doing so until Fb increases due to compression, until the force Fb equals the force Fa. At this point, $$PI \cdot \pi (db/2)^2 = PI \cdot \pi (da/2)^2$$

and the relationship between the pressures will be $$PI = PE \cdot (da/db)^2$$

or in other words, the interior pressure PI will always be greater than the environmental pressure PE, and the difference will be a percentage constant at all downhole depths and the corresponding pressures, the percentage being a function of the ratio of the squares of the diameters of the two piston heads. The above described embodiment provides perfect automatic depth and hence outside or environmental pressure compensations and a constant percentage positive differential pressure will be applied across the seal 5. Thus, constant controlled flow of lubricant through the seal at all depths is thereby achieved.

Figure 2:
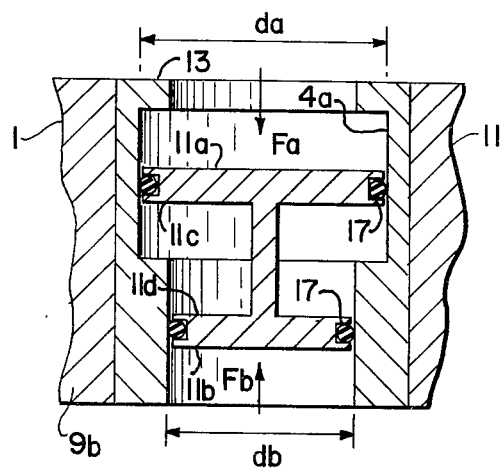
FIG. 2 is a cross-sectional view of the preferred embodiment of the present invention showing the various forces applied thereto.

Referring to FIG. 2, the interior piston space P is sealed from the environment E and the interior space I by means of seals such as O-rings 17. The space P is defined by the rear faces 11c and 11d of the piston 11 and by the periphery of the bores 9a and 9b in cylinder 9. The pressure PP within the space P has an effect on the pressure compensation. In discussing FIG. 1, the effect of the pressure PP was ignored and when the inner and outer forces balanced Fa equaled Fb. In considering the effect of PP, the assumption is made that the cross-sectional area of coupling element 12 is negligible with respect to the surfaces areas of the piston faces. The equation of the various forces on the piston are as follows:

$$Fa + Fd = Fb + Fc$$

thus $$(PE \cdot Aa) + (PP \cdot Ad) = (PI \cdot Ab) + (PP \cdot Ac)$$

where A is equal to area
$Aa = Ac$
$Ab = Ad$

If PP is approximately equal to either PE or PI, then the following is true $$PE(Aa + Ad - Ac) = PI(Ab)$$

since $Aa = Ac$
then $PE(Ad) = PI(Ab)$
therefore $PE = PI$

In other words, the amplification effect of the different piston head diameters has been negated. On the other hand, if PP is made much less or much greater than both PE and PI as, for example, when a device descends down a hole and the pressure PP which is atmospheric pressure remains that because of seal 17, then the PP terms in equations as above become negligible and thus $$PI = PE \ (Aa/Ab)$$

Since Aa is larger than Ab, PI, that is the pressure in the interior I will always be greater than PE, the pressure in the adjacent environment. Furthermore, as the pressure in the adjacent environment increases, the pressure PI will proportionally increase. Since the pressure in the interior is always maintained greater than in the exterior, there will be a flow of lubricant from the interior to the exterior around the seal thereby lubricating the seal and furthermore, the damaging elements of the environment will be prevented from entering the interior I because of the negative pressure differential. Also, from the above analysis it can be seen that since PP is generally at atmospheric pressure it only has an effect near the surface and as a drill moves downhole its effect becomes negligible and, therefore, amplification is obtained downhole.

In the event a drill is operating in an agressive environment at shallow depths where the pressure PE is close to atmospheric pressure, the amplifier effect can be obtained by either evacuating the air in volume P thereby lowering PP or by pressurizing the air in P thereby raising the pressure of PP and reversing the positions of cylinder 9 and piston 11 so that bore 9b and piston head 11b face the exterior E and bore 9a and piston head 11a face the interior I. The pressure PP in volume P is controlled by means of valve 10.

Figure 3:
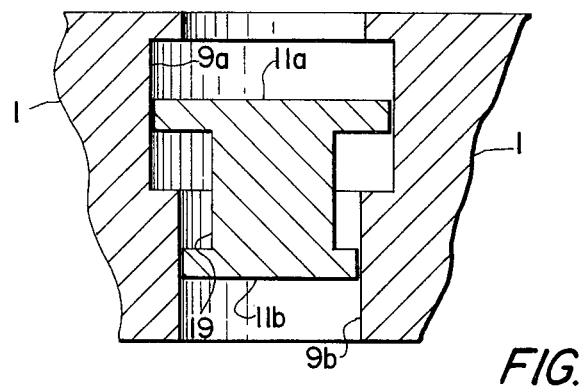
FIG. 3 is an alternative embodiment of the present invention.

FIG. 3 shows an alternate embodiment of the present invention in which the connector 19 which connects piston heads 11a and 11b is of a substantially greater diameter than that of connector 12 shown in FIG. 2. As discussed above, the basic objective of the pressure compensating and seal lubricating device is to maintain the internal presure PI at a value equal to the external pressure PE times the ratio of the square of the piston head diameters. Thus, the ratio of the pressure PE/PI is a constant for all depths and the differential pressure across the seals expressed as a percentage of external pressure PE is a constant. This relationship will be true, however, only so long as the piston head connecting rod diameter is small compared to the diameters of the piston heads. This constant percentage differential pressure across the axial seal increases the absolute pressure differential with the result that the seal lubricant flow from the interior to the exterior will increase with depth. This is often a desirable feature, however, in an application where it is desired to reduce the rate of increase of seal lubricant flow with depth, this can be done by increasing the diameter of the connector such as with connector 19 shown in FIG. 3.

The effect, when the diameter of the connector 19 is substantial relative to the diameter of the piston heads, as the device progresses downhole and as the piston advances inside the cylinder, is that the volume P will be decreasing which produces a proportional increase in pressure PP. The increasing pressure PP produces a force on the piston opposing its pressure correction movement originating from increasing exterior pressure PE which in turn therefore, tends to reduce the pressure correction. By varying the value of the diameter of connector 19 the amplification effect can be varied all the way from providing constant percentage seal differential pressure to virtually constant absolute seal differential pressure, the later case causing constant seal lubricant flow.

Although in the above embodiments a single piston has been shown, a plurality of parallel pistons and cylinders can be used.

Figure 4:
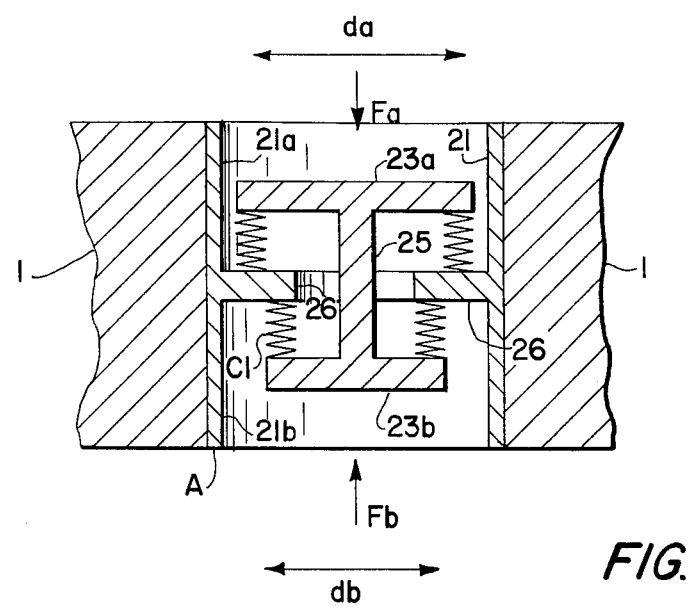
FIG. 4 is another alternative embodiment of the present invention.

In some circumstances, it may be desirable to provide a depth compensator and lubricating device which eliminates friction between the piston and cylinder. Such an embodiment is shown in FIG. 4. Referring to FIG. 4, cylinder 21 has a first bore 21a and a second bore 21b separated by separating member 21c. Positioned within the cylinder 21 is a piston 23 having a first piston head 23a, and a second piston head 23b, which are rigidly connected together by connector 25. The diameter of the piston head is less than the diameter of the cylinder bores and therefore, there is no friction between these elements. The piston 23 is supported by bellows 27 and 29, the seal between the exterior E and interior I is effected by means of the bellows 27 and 29. The bellows produce a biasing effect which has an effect on the overall operation of the device. As discussed above, in operation, the interior I of a downhole device is generally pre-filled with a lubricant. In this situation using a compensating device such as that shown in FIG. 4, the lubricant will displace the piston 23 such that bellows 29 are compressed and bellows 27 are extended. Thus, both bellows are active due to the spring effect to add to the force of the external pressure PE. During progress down the hole and as the piston approaches its other piston end limit, the spring effect of the bellows will be reversed giving a result in force that adds to the force from the internal pressure PI. The relationship between the internal and external pressures of the devices will, therefore, be modified by the spring effect which will increase the amplification ratio at the start of piston travel and reduce it at the end of piston travel.

Referring to FIG. 5, a pressure compensating and seal lubricating device is illustrated in use with a rotary drill having a solid conical cutting head similar to that shown in U.S. Pat. No. 4,154,312 which is incorporated herein by reference. Referring to FIG. 5, the drill bit comprises an upper housing 31 and a cutting head or cone 33 rotatably mounted therein. The cutting head 33 is supported in the head 31 by means of bearings 35, 37, 39 and 41. The pressure compensating and seal lubricating device is generally indicated at 43 and it comprises a cylinder 45 having a first bore 47a and a second bore 47b. The first piston head 49a is positioned in bore 47a and a second piston head 49b is positioned in bore 47b, the piston heads 49a and 49b are rigidly connected to each other by a connector 51. The piston heads 49a and 49b and the connector 51 can be formed as a single integral element as illustrated. Seals 53 form a seal between the piston head and the cylinder. A lubricant is added to the interior of the upper portion 31 through channel 55 after removing plug 57. This lubricant lubricates the bearing structure, retaining structure and the seals generally indicated at 59. The pressure compensation and seal lubrication is accomplished in the manner described above with respect to the previously discussed embodiments.

Although the pressure compensator and seal lubricating device 43 shown in FIG. 5 is of the type illustrated in FIG. 1, it is readily apparent that any of the other embodiments disclosed herein can be used in lieu of the specific embodiment shown in FIG. 5.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic depth compensating device for controlling the pressure in a first volume in response to pressure changes in an environment adjacent to said first volume said device comprising:
   (a) a cylinder, said cylinder including a first bore having a first cross-sectional area and a second bore having a second cross-sectional area, said first and second bores being axially aligned;
   (b) first piston means having a first surface area, said first piston means being slidably positioned in said first bore;
   (c) second piston means having a second surface area, said second piston means being slidably positioned in said second bore, wherein said first and second surface areas are different and a second volume is formed between said first and second piston means; and
   (c) coupling means for rigidly coupling said first and second piston means such that said first and second piston means move together wherein said coupling means is positioned in said second volume and the portion of said second volume occupied by said coupling means is negligible relative to said second volume.

2. An automatic depth compensating device as set forth in claim 1 including first seal means for forming a seal between said first bore and said first piston means and second seal means for forming a seal between said second bore and said second piston means whereby said second volume is sealed from said first volume and from said environment.

3. An automatic depth compensating device as set forth in claim 1 including means for controlling the pressure in said second volume.

4. An automatic depth compensating device as set forth in claim 1 wherein said first piston means, said second piston means and said coupling means are integral.

5. A self lubricating sealed apparatus, said apparatus comprising:
   (a) a first member;
   (b) a second member rotatable relative to said first member;
   (c) seal means positioned between said first and second members, said first and second members defining a first space, said space being sealed from an external environment by said seal means;
   (d) pressure compensating means mounted on said first member, said pressure compensating means comprising:
      (i) a first cylinder having a bore therein having a first cross-sectional area;
      (ii) a second cylinder having a bore therein having a second cross-sectional area;

(iii) a piston means having a first head means slidably positioned in said first cylinder and exposed to sad environment and a second head slidably positioned in said second cylinder and exposed to said first space wherein said first and second heads are spaced from one another to form a second space therebetween, and wherein the surface area of said first head differs from that of the surface area of said second head;

(iv) coupling means in said second space for rigidly fixing together said first and second piston heads wherein the cross-sectional area of said coupling means is negligible relative to the surface area of said first and second piston heads;

wherein the pressure in said environment against said first head means and the pressure in said first space against said second head means causes the movement of said piston means in said first and second cylinders such that said pressure compensating means maintains the pressure in said space proportional to and greater than the pressure in said environment whereby lubricant in said space is forced into said environment around said seal means.

6. A self lubricating sealed apparatus as set forth in claim 5 including second seal means for forming a seal between said piston and said first and second cylinders thereby sealing said space.

7. A self lubricating sealed apparatus as set forth in any of claims 5–6 wherein the cross-sectional area of the bore of said first cylinder is substantially the same as the surface area of said first piston head and the cross-sectional area of the bore of said second cylinder is substantially the same as the surface area of said second piston head.

8. In a rotary drill for drilling a well in the surface of the earth, said drill comprising:

(a) a drill bit including an upper portion for connection to a drill string, duct means including a fluid outlet into the well for carrying fluid to extract detritus and clean the bottom of the well and receiving means;

(b) a solid cutting head comprising a conical head portion and a unitary stem portion with no internal passages therein, said conical head portion including holes therein and cutting elements inserted in said holes, said stem portion being received in said receiving means of said drill bit, wherein said stem and said receiving means include holding means for rotatably holding said cutting head in said drill bit;

(c) bearing means between said drill bit and said conical head, said bearing means being fixed relative to said drill bit and to said conical head for preventing movement between bearing surfaces of the bearing means which contact the drill bit and conical head and the drill bit and conical head, but allowing said conical head to rotate relative to said drill bit; and (d) a lubrication system, independent of said duct means, interconnected between said drill bit and said cutting head said lubricating system including a compensating means for regulating the pressure in the lubricating system in response to the pressure in the bore hole surrounding the bit, the improvement wherein said compensating means comprises:

(e) a cylinder mounted in said upper portion, said cylinder including a first bore having a first cross-sectional area and a second bore having second cross-sectional area, said first and second bores being axially aligned;

(f) first piston means having a first surface area said first piston means being slidably positioned in said first bore;

(g) second piston means having a second surface area, said second piston means being slidably positioned in said second bore wherein the area of said first and second surface areas are different; and (h) coupling means for rigidly coupling said first and second piston means, the cross-sectional area of said coupling means being negligible with respect to said second surface area, wherein said first and second piston means move together.

9. A rotary drill as set forth in claim 8 wherein said first piston means, said second piston means and said coupling means are integral.

10. A rotary drill as set forth in claim 8 including a closed space formed between said first and second piston means.

11. A rotary drill as set forth in claim 10 including means for controlling the pressure in said closed space.

12. A rotary drill as set forth in claim 8 wherein said first surface area is substantially the same as said first cross-sectional area and said second surface area is substantially the same as said second cross-sectional area.

* * * * *